United States Patent
Endo et al.

(10) Patent No.: US 10,626,331 B2
(45) Date of Patent: *Apr. 21, 2020

(54) BIOMASS FUEL PRODUCTION PLANT

(71) Applicant: MITSUBISHI HEAVY INDUSTRIES ENVIRONMENTAL & CHEMICAL ENGINEERING CO., LTD., Yokohama-shi, Kanagawa (JP)

(72) Inventors: Yuki Endo, Yokohama (JP); Tomoki Ichinose, Yokohama (JP); Keiichi Ishikawa, Yokohama (JP)

(73) Assignee: MITSUBISHI HEAVY INDUSTRIES ENVIRONMENTAL & CHEMICAL ENGINEERING CO., LTD., Yokohama-Shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/077,914

(22) PCT Filed: Feb. 15, 2017

(86) PCT No.: PCT/JP2017/005500
§ 371 (c)(1),
(2) Date: Aug. 14, 2018

(87) PCT Pub. No.: WO2017/141955
PCT Pub. Date: Aug. 24, 2017

(65) Prior Publication Data
US 2019/0048267 A1     Feb. 14, 2019

(30) Foreign Application Priority Data
Feb. 18, 2016  (JP) ................ 2016-028725

(51) Int. Cl.
*C10B 47/30* (2006.01)
*C10B 53/02* (2006.01)
(Continued)

(52) U.S. Cl.
CPC ............ *C10B 57/10* (2013.01); *C10B 41/00* (2013.01); *C10B 47/30* (2013.01); *C10B 53/02* (2013.01);
(Continued)

(58) Field of Classification Search
CPC ........... C10B 47/30; C10B 1/10; C10B 57/10; C10B 53/02
See application file for complete search history.

(56) References Cited

U.S. PATENT DOCUMENTS 2,973,306 A * 2/1961 Chick ............... C10B 47/44
                                                    201/1
4,090,945 A * 5/1978 Reeves ............. C10B 53/06
                                                    201/1
(Continued)

FOREIGN PATENT DOCUMENTS

JP   H03-080295 U   8/1991
JP   2008-180451 A  8/2008
(Continued)

OTHER PUBLICATIONS

Quaak et al., "Energy from Biomass: A Review of Combustion and Gasification Technologies, vols. 23-422" 1999, World Bank Publications, pp. 3 and 4, avialable online at: https://books.google.com/books?id=M2WMrePlIxkC&dq=relationship+between+LHV+and+bulk+density&source=gbs_navlinks_s (Year: 1999).*
(Continued)

*Primary Examiner* — Jonathan Luke Pilcher
(74) *Attorney, Agent, or Firm* — Manabu Kanesaka; Kenneth Berner; Benjamin Hauptman

(57) ABSTRACT

A biomass fuel production plant includes: a drying heat source that generates a heat medium; a drying device that uses the heat medium supplied from the drying heat source to heat and dry wood biomass; a carbonized product pro-
(Continued)

duction device that is configured to perform pyrolysis of the dried wood biomass to produce a carbonized product; a bulk density measurement device that measures a bulk density of the carbonized product discharged from the carbonized product production device; and a control device that controls a heat quantity of the heat medium supplied to the wood biomass in the drying device. The control device includes an LHV calculation unit that is configured to calculate the LHV of the carbonized product from the bulk density, and controls the heat quantity of the heat medium supplied to the wood biomass in the drying device on the basis of the calculated LHV.

8 Claims, 6 Drawing Sheets

(51) Int. Cl.
*C10B 57/10* (2006.01)
*C10B 1/10* (2006.01)
*C10B 41/00* (2006.01)
*C10L 5/44* (2006.01)

(52) U.S. Cl.
CPC ............... *C10L 5/447* (2013.01); *C10B 1/10* (2013.01); *C10L 2200/0469* (2013.01); *C10L 2290/02* (2013.01); *C10L 2290/06* (2013.01); *C10L 2290/08* (2013.01); *C10L 2290/58* (2013.01); *C10L 2290/60* (2013.01); *Y02E 50/10* (2013.01); *Y02E 50/14* (2013.01); *Y02E 50/30* (2013.01); *Y02P 20/129* (2015.11)

(56) References Cited

U.S. PATENT DOCUMENTS

| | | | | |
|---|---|---|---|---|
| 5,423,455 A | * | 6/1995 | Ricciardi | ............ G01G 11/086 141/1 |
| 5,821,396 A | | 10/1998 | Bouziane | |
| 8,388,813 B1 | | 3/2013 | Livingston et al. | |
| 2008/0078552 A1 | * | 4/2008 | Donnelly | ............ E21B 41/0064 166/303 |
| 2011/0214343 A1 | * | 9/2011 | Wechsler | ................ C10B 53/02 44/605 |
| 2012/0055775 A1 | * | 3/2012 | Manderson | ............... C10B 1/10 201/35 |
| 2014/0026791 A1 | | 1/2014 | Okazaki et al. | |
| 2018/0208851 A1 | * | 7/2018 | Endou | ..................... C10B 53/02 |

FOREIGN PATENT DOCUMENTS

| | | |
|---|---|---|
| JP | 2012-219176 A | 11/2012 |
| JP | 2014-065807 A | 4/2014 |
| JP | 2015-010137 A | 1/2015 |

OTHER PUBLICATIONS

Meyer et al., "Design and Build of a 1 Kilowatt Organic Rankine Cycle Power Generator", 35th New Zealand Geothermal Workshop: 2013 Proceedings, Nov. 17-20, 2013, Rotorua, New Zealand , Available online at: https://www.geothermalenergy.org/pdf/IGAstandard/NZGW/2013/Meyer_Final.pdf (Year: 2013).*
Google machine translation of JP 03-080295U (Year: 1991).*
PCT/ISA/210, "International Search Report for International Application No. PCT/JP2017/005500," dated Mar. 14, 2017.
PCT/ISA/237, "Written Opinion of the International Searching Authority for International Application No. PCT/JP2017/005500," dated Mar. 14, 2017.
PCT/ISA/210, "International Search Report for International Application No. PCT/JP2015/071643," dated Oct. 13, 2015.
PCT/ISA/237 "Written Opinion of the International Searching Authority for International Application No. PCT/JP2015/071643," dated Oct. 13, 2015.
U.S.P.T.O., "Non-Final Rejection for U.S. Appl. No. 15/745,909," dated Aug. 9, 2019.
U.S.P.T.O., "Final Rejection for U.S. Appl. No. 15/745,909," dated Nov. 25, 2019.

* cited by examiner

BIOMASS FUEL PRODUCTION PLANT

TECHNICAL FIELD

The present invention relates to a biomass fuel production plant that performs pyrolysis of wood biomass to produce a carbonized product.

Priority is claimed on Japanese Patent Application No. 2016-028725, filed Feb. 18, 2016, the contents of which are incorporated herein by reference.

BACKGROUND ART

For the purpose of more efficiently using energy of wood biomass, carbonizing treatment of the wood biomass is performed in an attempt to improve a heating value. As the carbonizing treatment of the wood biomass, for example a method of indirectly heating the wood biomass under a low oxygen atmosphere at a high temperature of 300° C. to 700° C. using a pyrolysis furnace such as an external heat type pyrolytic gasification furnace is known. According to this method, a carbonized product with an improved heating value can be produced.

As a method of producing the carbonized product, high-temperature carbonization in which wood biomass is indirectly heated at a high temperature of 500° C. to 700° C., and half carbonization (torrefaction) in which wood biomass is indirectly heated at 300° C. or so are known. In the high-temperature carbonization, a carbonized product in which a high gasification rate and spontaneous exothermicity are suppressed can be produced by securing a sufficient treatment time at a predetermined temperature. In the half carbonization, a carbonized product with both crushability and a residual ratio of heat quantity can be produced by controlling a temperature range to be very narrow see Patent Document 1).

CITATION LIST

Patent Literature

[Patent Document 1]
Japanese Unexamined Patent Application, First Publication No. 2012-219176

SUMMARY OF INVENTION

Technical Problem

Meanwhile, the moisture content of the wood biomass that is a raw material for the carbonized product is changed, and thus influences quality of the carbonized product to be produced. To produce a carbonized product having stable quality, control corresponding to the moisture content is required, for instance adjustment of the amount of heating gas supplied to a pyrolysis furnace is performed. However, the adjustment of the amount of heating gas supplied to the pyrolysis furnace alone is not sufficient, and more stable quality needs to be secured.

This invention is directed to further stabilizing quality of a carbonized product to be produced in a, biomass fuel production plant that is configured to perform pyrolysis and carbonization on wood biomass.

Solution to Problem

According to a first aspect of the present invention, a biomass fuel production plant includes: a drying heat source configured to generate a heat medium; a drying device configured to use the heat medium supplied from the drying heat source to heat and dry wood biomass; a carbonized product production device configured to perform pyrolysis of the dried wood biomass to produce a carbonized product; a bulk density measurement device configured to measure a bulk density of the carbonized product discharged from the carbonized product production device; and a control device configured to control a heat quantity of the heat medium supplied to the wood biomass in the drying device. The control device includes an LHV calculation unit that is configured to calculate an LHV of the carbonized product from the bulk density. The control device controls the heat quantity of the heat medium supplied to the wood biomass in the drying device on the basis of the calculated LHV.

According to this configuration, because the heat quantity supplied to the wood biomass in the drying device is controlled on the basis of the LHV of the carbonized product which is one index that indicates combustion performance of the carbonized product and which customers may ask to see (LHV is short for "lower heating value," and refers to a lower heating value or a net heating value), dried biomass having a moisture content that is most suitable for carbonization can be produced. That is, since the heat quantity supplied to the wood biomass is adjusted such that the LHV of the carbonized product becomes a proper value using a correlation between the bulk density and the LHV of the carbonized product, a carbonized product having stable quality can be produced.

In the biomass fuel production plant, the drying heat source may includes a combustion furnace that is configured to burn a pyrolytic gas discharged from the carbonized product production device, and a first heat exchanger that is configured to perform heat exchange between a combustion exhaust gas discharged from the combustion furnace and air to generate high-temperature air. The heat medium may be the high-temperature air subjected to heat exchange with the combustion exhaust gas by the first heat exchanger.

According to this configuration, because the combustion furnace is used as the drying heat source, the high-temperature air can be stably generated.

In the biomass fuel production plant, the drying heat source may include: a power generation device that uses the high-temperature air as a heat source; and a first waste heat medium line that is configured to supply a waste heat medium having waste heat from the power generation device to the drying device as a heat source.

According to this configuration, power generation can be performed using heat of the combustion exhaust gas. Waste heat of the power generation can be used as a heat source of the drying device.

In the biomass fuel production plant, the drying heat source may include a second heat exchanger that is configured to perform heat exchange between the high-temperature air and a medium for power generation that serves as the heat source of the power generation device. The heat medium may be the high-temperature air that has been subjected to heat exchange with the medium for power generation by the second heat exchanger.

In the biomass fuel production plant, the drying heat source may include a second waste heat medium line that is configured to supply the waste heat medium that has been used by the drying device to the power generation device, and a third heat exchanger that is provided on at least one of the first waste heat medium line and the second waste heat medium line, and performs heat exchange between the high-temperature air that has been subjected to heat exchange with the medium for power generation by the second heat exchanger and the waste heat medium. The heat medium may be the high-temperature air that has been subjected to heat exchange with the waste heat medium by the third heat exchanger.

In the biomass fuel production plant, the power generation device may be an ORC power generation device that is configured to evaporate a macromolecular organic working medium to perform power generation. The waste heat medium may be hot water that is used to cool the ORC power generation device.

Advantageous Effects of Invention

According to the present invention, because the heat quantity supplied to the wood biomass in the drying device is controlled on the basis of the LHV of the carbonized product, dried biomass having a moisture content that is most suitable for carbonization can be produced. That is, because the heat quantity supplied to the wood biomass is adjusted such that the LHV of the carbonized product becomes a proper value using a correlation between the bulk density and the LHV of the carbonized product, a carbonized product having stable quality can be produced.

DESCRIPTION OF EMBODIMENTS

[First Embodiment]

Figure 1:
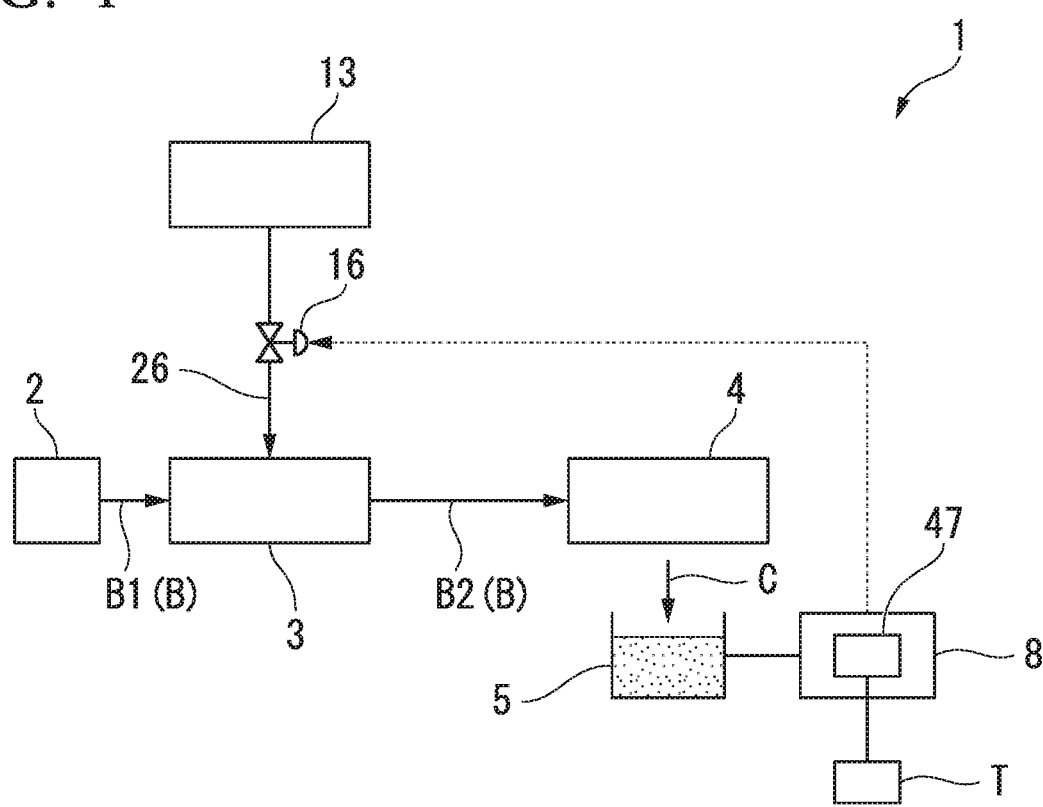
FIG. 1 is a system diagram of a biomass fuel production plant of a first embodiment of the present invention.

Hereinafter, biomass fuel production plants of embodiments of the present invention will be described with reference to the drawings. FIG. 1 is a schematic configurational diagram showing an example of a biomass fuel production plant 1 of the present embodiment.

As shown in FIG. 1, the biomass fuel production plant 1 of the present embodiment includes a wood biomass supply device 2, a drier (a drying device) 3 that dries wood biomass B1 supplied from the wood biomass supply device 2, a carbonized product production device 4 that pyrolyzes wood biomass B2 to produce a carbonized product C, a bulk density measurement device 5 that measures a bulk density of the carbonized product C, a drying heat source 13 that produces a heat medium that is a heat source of the drier 3, and a control device 8.

Wood biomass B is biomass (a biological resource) made of wood, and is leftover materials from a forest such as branches, leaves, etc. generated when trees are lumbered or logged, or wood pellets or wood chips produced from bark or sawdust generated from a sawmill or the like.

The carbonized product production device 4 has an external heat type pyrolytic gasification furnace (a pyrolysis furnace) 53 of an indirect heating type (see FIG. 2) which indirectly heats the wood biomass B to cause a pyrolysis or gasification reaction. Due to progress of pyrolysis, the wood biomass B is carbonized while generating a pyrolytic gas. The produced carbonized product C is discharged to the bulk density measurement device 5.

The drier 3 is a device that heats and dries the wood biomass B using a heat medium supplied from the drying heat source 13. The drier 3 dries the wood biomass B having, for instance, a moisture content of 40% to 60% to, for instance, a moisture content of 10% to 20%.

As the drier 3, a belt drier 3 for drying wood biomass B placed on a belt by spraying a high-temperature dry gas on the wood biomass B may be adopted. Instead of the belt drier 3, the drier 3 may include a rotary kiln type drier or a disk drier. A heating method of the drier 3 may be either indirect heating or direct heating.

The drying heat source 13 is, for instance, an incinerator that incinerates waste, and the heat medium is a high-temperature exhaust gas or high-temperature air subjected to heat exchange. The drying heat source 13 is not limited thereto, and a power plant or the like can also be used. Waste heat of the power plant can also be used as a heat source.

The drying heat source 13 and the drier 3 are connected by a heat medium line 26. That is, a heat medium generated by the drying heat source 13 is introduced into the drier 3 via the heat medium line 26.

A control damper 16 for adjusting a flow rate or a heat quantity of the heat medium supplied to the drier 3 is provided on the heat medium line 26. The control damper 16 can be controlled by the control device 8.

Figure 2:
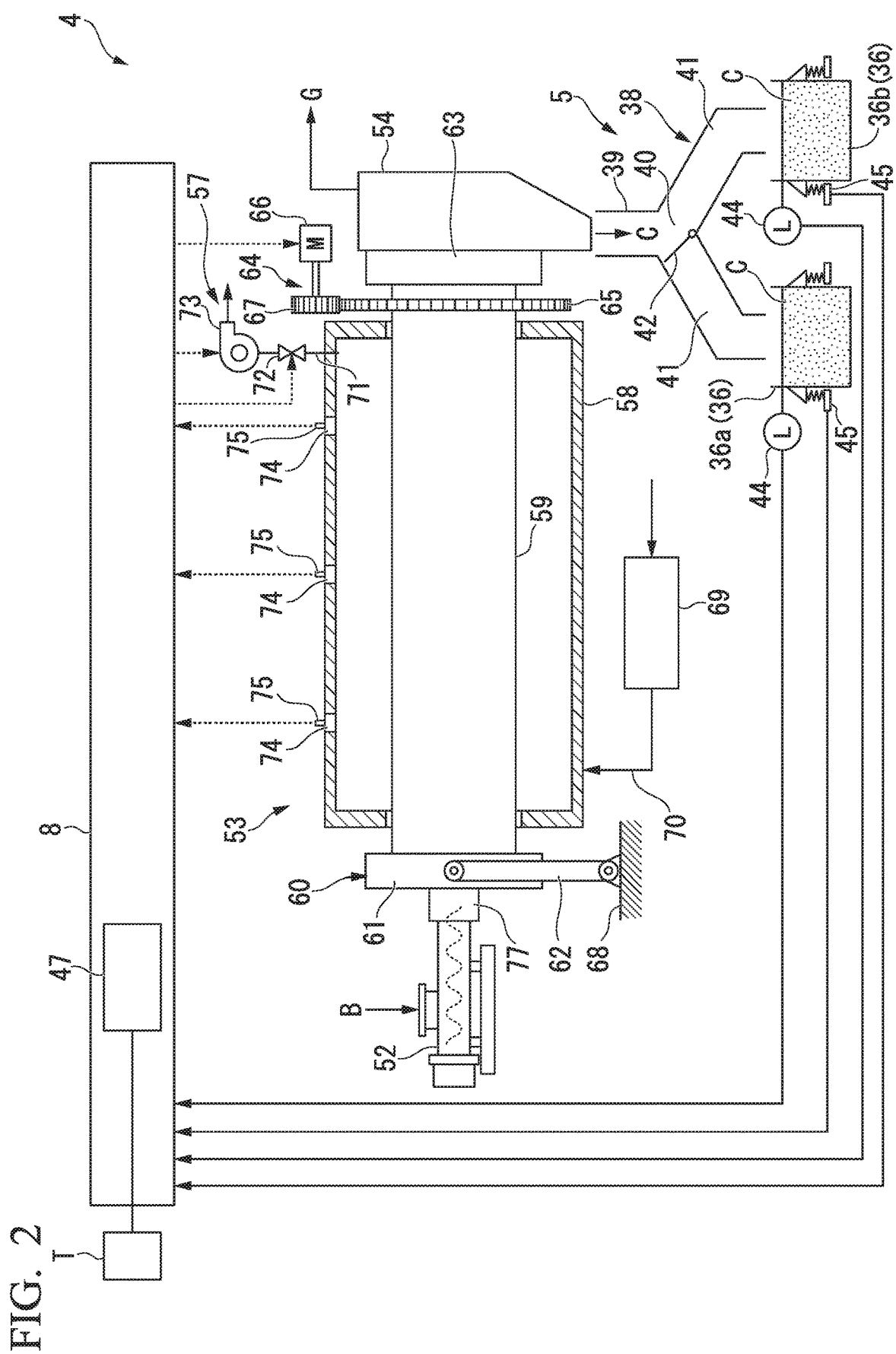
FIG. 2 is a schematic configurational diagram of a carbonized product production device of the first embodiment of the present invention.

As shown in FIG. 2, the carbonized product production device 4 has a screw conveyor 52 that conveys the wood biomass B that is the raw material, an external heat type pyrolytic gasification furnace 53 that carbonizes the wood biomass B charged from the screw conveyor 52 by pyrolizing the wood biomass B, and a chute 54 that discharges the carbonized product C discharged from the external heat type pyrolytic gasification furnace 53.

The external heat type pyrolytic gasification furnace 53 is an indirect heating type pyrolysis furnace that indirectly heats the wood biomass B to cause a pyrolysis or gasification reaction.

The external heat type pyrolytic gasification furnace 53 is an external heat type rotary kiln type that has an external cylinder (a muffle) 58 and an internal cylinder (a kiln shell) 59 which is rotated relative to the external cylinder 58 and into which the wood biomass B is charged.

In the carbonized product production device 4 of the present embodiment, the external heat type rotary kiln type is used as the external heat type pyrolytic gasification furnace 53, but the external heat type pyrolytic gasification furnace 53 is not limited thereto as long as it is a type that indirectly heats the wood biomass B. For example, an external heat type screw conveyor or the like may be used as the external heat type pyrolytic gasification furnace 53.

An upstream side of the internal cylinder 59 is supported to be rotatable about an axis by a movable side support 60 that is movable in an axial direction. A downstream side of the internal cylinder 59 is supported to be rotatable about the axis by a stationary side support 63.

The screw conveyor 52 for charging the wood biomass B is provided on the movable side support 60 that configures an inlet part of the internal cylinder 59. The chute 54 that discharges the carbonized product C is provided on the stationary side support 63 that configures an outlet part of the internal cylinder 59.

The movable side support 60 has an annular frame 61 that rotatably supports the internal cylinder 59. Opposite lateral parts of the annular frame 61 are rotatably supported by upper ends of a support member 62 that is rockably raised from an installation surface 68.

A plurality of fins (or a spiral (not shown)) arranged to be inclined with respect to a circumferential direction are provided on an inner wall portion of the internal cylinder 59, and the internal cylinder 59 is driven and rotated at a predetermined rotation speed (e.g., 1 to 5 rpm) by a driving device 64, so that the wood biomass B charged from the inlet side (the upstream side) thereof can be transferred to the outlet side (the downstream side) thereof while being heated. Instead of providing the fins, the internal cylinder 59 may be supported to be rotatable about an axis that is slightly inclined with respect to the horizon. In this case, the wood biomass B may be transferred to the outlet side by the inclination and the rotation of the internal cylinder 59.

The driving device 64 has a gear 65 that is provided on the internal cylinder 59, a driving motor 66, and a pinion gear 67 that is mounted on a rotational shaft of the driving motor 66 and is engaged into the gear 65. The driving device 64 transmits driving of the driving motor 66 to the gear 65 and rotates the gear 65, thereby rotating the internal cylinder 59 about the axis.

The external cylinder 58 is fixed to an installation region via a support member 62 (not shown) in a state in which the rotation and the axial movement of the internal cylinder 59 are permitted and sealing between the external cylinder 58 and the internal cylinder 59 is secured.

The movable side support 60 and the stationary side support 63 of the internal cylinder 59 form an air seal between a rotating portion and a non-rotating portion thereof. An expansion 77 for absorbing displacement of the movable side support 60 in an axial direction is provided at a connection portion between the movable side support 60 and the screw conveyor 52.

A heating gas supply pipe 70 that connects the external cylinder 58 to a heating gas combustion furnace 69 that functions as a heater for supplying a heating gas is connected to one end of the external cylinder 58. A heating gas outgoing pipe 71 is connected to the other end of the external cylinder 58. A heating gas amount adjusting damper 72 and an induction fan 73 that function as a heating gas amount adjusting device 57 are provided on the heating gas outgoing pipe 71.

A plurality of inspection windows 74 are provided at an upper portion of the external cylinder 58 apart from each other in an axial direction. Non-contact thermometers 75 for measuring temperatures of the kiln shell (temperatures of a steel shell of the internal cylinder 59) are provided on the inspection windows 74 to face an outer circumferential surface of the internal cylinder 59 rotated about the axis. Radiation thermometers may be used as the non-contact thermometers 75.

The control device 8 and the non-contact thermometers 75 are communicably connected, and the temperatures of the kiln shell measured by the non-contact thermometers 75 are configured to be input to the control device 8.

Since the temperatures of the kiln shell are temperatures of internal portions of the internal cylinder 59 which are in direct contact with the wood biomass B, they have a high correlation with a pyrolytic temperature of the wood biomass B, and reflect a heating situation well. For this reason, temperature control is performed on the basis of the temperatures of the kiln shell, and thereby a heating temperature can be stably controlled.

The control device 8 adjusts an amount of the heating gas by a degree of opening of the heating gas amount adjusting damper 72 and a rotational frequency of the induction fan 73 such that the temperatures of the kiln shell are maintained within a predetermined temperature range.

When the temperatures of the kiln shell cannot be maintained within a predetermined temperature range in spite of adjusting the amount of the heating gas, the rotational frequency of the internal cylinder 59 is increased (a rotation speed is raised), and thereby evaporation of moisture is accelerated. As the evaporation of moisture increases, the temperatures of the kiln shell are lowered.

The bulk density measurement device 5 has a duct 38 into which the carbonized product C discharged from the chute 54 is introduced, and two storage tanks 36 in which the carbonized product C is stored via the duct 38. The duct 38 is divided into two ducts at a downstream side. That is, the duct 38 has an upstream side duct 39 provided at an upstream side, a branch part 40, and a pair of downstream side ducts 41 provided downstream from the branch part 40. A switching damper 42 is provided on the branch part 40.

The carbonized product C introduced into the upstream side duct 39 from the chute 54 is introduced into any of the downstream side ducts 41 by the switching damper 42. The pair of downstream side ducts 41 are disposed to introduce the carbonized product C into a first storage tank 36*a* and a second storage tank 36*b*. The switching damper 42 is controlled by the control device 8.

A level meter 44 and a weighing scale 45 are provided for each of the storage tanks 36. The level meter 44 is a sensor capable of detecting that a predetermined volume of carbonized product C is stored in each of the storage tanks 36. When a predetermined volume of carbonized product C is stored in each of the storage tanks 36, the level meter 44 can transmit a signal to the control device 8. For example, a sensor using infrared rays or a sensor using a contact type switch may be adopted as the level meter 44.

The weighing scale 45 is a device that can measure the weight of the carbonized product C stored in each of the storage tanks 36. The weighing scale 45 can transmit the measured weight to the control device 8.

The control device 8 includes an LHV calculation unit 47 that calculates an LHV (a lower heating value or a net heating value) of the carbonized product C, and adjusts a heat quantity of the heat medium supplied from the drying heat source 13 to the drier 3 on the basis of the calculated LHV.

As the LHV of the carbonized product C increases, the moisture content of the wood biomass B decreases. As the LHV of the carbonized product C decreases, the moisture content of the wood biomass B increases.

Figure 3:
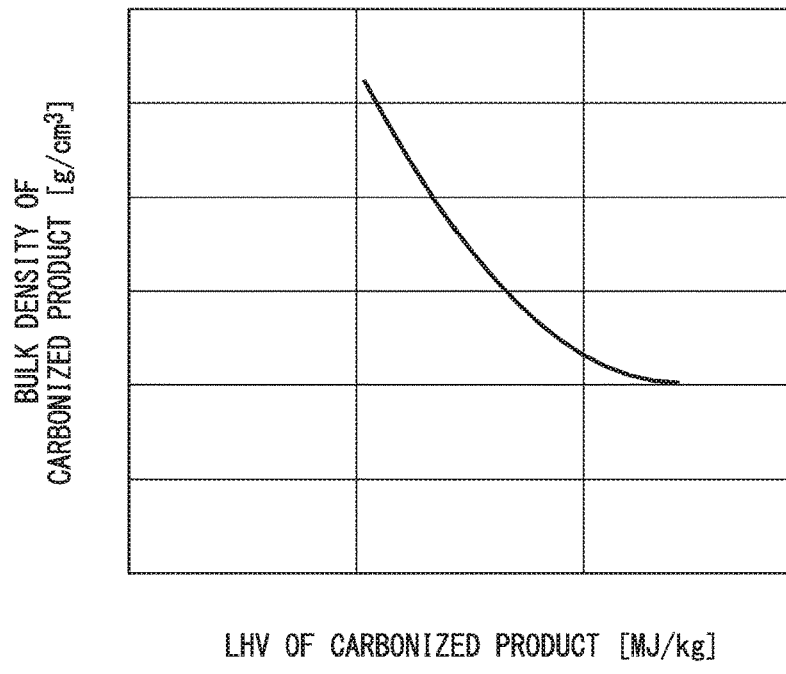
FIG. 3 is a graph showing a correlation between an LHV of a carbonized product and a bulk density of the carbonized product.

As shown in FIG. 3, the inventors have found that there is a correlation between the LHV of the carbonized product C and the bulk density of the carbonized product C. FIG. 3 is a graph showing a correlation between the LHV of the carbonized product C and the bulk density of the carbonized product C. In FIG. 3, the horizontal axis indicates the LHV [MJ/kg] of the carbonized product C, and the vertical axis indicates the bulk density [g/cm$^3$] of the carbonized product C.

According to the graph (FIG. 3) obtained through investigation by the inventors, the carbonized product C has a relationship in which a lower bulk density results in a higher LHV and that a higher bulk density results in a lower LHV.

The control device 8 of the present embodiment can refer to a table T (see FIG. 1) in which the correlation between the bulk density and the LHV of the carbonized product C which is shown in FIG. 3 is stored. That is, the LHV calculation unit 47 of the control device 8 can calculate the LHV of the carbonized product C on the basis of the bulk density of the carbonized product C.

When an LHV corresponding to an optimum moisture content of the wood biomass B is set to X [MJ/kg], the control device 8 reduces a heat quantity supplied to the wood biomass B when the LHV of the carbonized product C is higher than X. The control device 8 increases the heat quantity supplied to the wood biomass B when the LHV is lower than X.

Next, a method of producing the carbonized product C using the production device for the carbonized product C of the present embodiment will be described.

The method of producing the carbonized product C of the present embodiment has a wood biomass drying process of drying the wood biomass B, a pyrolyizing process of performing pyrolysis of the wood biomass B to carbonize the wood biomass B, an LHV calculating process of calculating an LHV of a carbonized product C that is the carbonized wood biomass B, and a supplied heat quantity controlling process of controlling a heat quantity supplied to the wood biomass B per unit time in the drying process on the basis of the calculated LHV.

In the wood biomass drying process, the wood biomass B charged into the drier 3 from the wood biomass supply device 2 is dried by the heat medium supplied from the drying heat source 13.

The wood biomass B dried by the drier 3 is introduced into the internal cylinder 59 of the external heat type pyrolytic gasification furnace 53 by the screw conveyor 52.

A heating gas is supplied from the heating gas combustion furnace 69 into the external cylinder 58 of the external heat type pyrolytic gasification furnace 53 by an induction action of the induction fan 73, and the internal cylinder 59 located inside the external cylinder 58 is heated from an outer circumferential surface thereof by the heating gas.

In the pyrolyizing process, the wood biomass B introduced into the internal cylinder 59 is indirectly heated and carbonized under a low oxygen atmosphere at a high temperature of 300° C. to 700° C.

To be specific, the wood biomass B is heated while being transferred to the outlet side of the internal cylinder 59 along with rotation of the internal cylinder 59. Thereby, moisture remaining in the wood biomass B is evaporated first. With the completion of the moisture evaporation, pyrolysis of organic components makes progress. With the progress of the pyrolysis, the wood biomass B is carbonized while generating a pyrolytic gas G. The carbonized wood biomass B is discharged from the chute 54 as a produced carbonized product C (solid fuel) having a predetermined degree of carbonization.

Meanwhile, the pyrolytic gas G generated by pyrolysis is introduced from the chute 54 into the heating gas combustion furnace 69, and is burnt along with auxiliary fuel or combustion air subjected to heat exchange with the heating gas outgoing pipe 71. A part of the burnt gas flows back to the heating gas combustion furnace 69, is burned in the heating gas combustion furnace 69 along with the auxiliary fuel, and is used for heating of the external heat type pyrolytic gasification furnace 53.

In the pyrolyizing process, a heat quantity supplied to the wood biomass B per unit time is adjusted by the control device 8.

The LHV calculating process is a process of an of the produced carbonized product C.

In the LHV calculating process, first, the carbonized product C discharged via the chute 54 is introduced into one of the storage tanks 36 (here, the first storage tank 36a). When the carbonized product C stored in the first storage tank 36a reaches a predetermined volume, the level meter 44 sends a signal to the control device 8.

When the control device 8 receives a signal from the level meter 44, it obtains weight of the carbonized product C from the weighing scale 45 at that point in time. The control device 8 divides the weight of the carbonized product C by a volume, thereby calculating a bulk density of the carbonized product C. That is, when a volume of the carbonized product C is defined as V, and weight of the carbonized product C in the case of the volume V is defined as M, a bulk density D of the carbonized product C can be calculated by D=M/V. The bulk density of the carbonized product C can be calculated according to the "bulk density testing method" described in section 6 of JIS K 2151.

When the calculation of the bulk density of the carbonized product C stored in the first storage tank 36a is completed, the carbonized product C inside the first storage tank 36a is discharged by a predetermined method.

The control device 8 operates the switching damper 42 such that the level meter 44 of the first storage tank 36a transmits the signal and, at the same time, the carbonized product C is introduced into the other of the storage tanks 36 (the second storage tank 36b). Thereby, the carbonized product C is stored in the second storage tank 36b. Hereinafter, an LHV of the carbonized product C is calculated by the same method as the method of calculating the LHV of the carbonized product C in the first storage tank 36a.

Since the first storage tank 36a and the second storage tank 36b are alternately used, the bulk density of the carbonized product C can be continuously calculated.

The LHV calculation unit 47 calculates the LHV of the carbonized product C stored in the storage tanks 36 using the table T in which the correlation between the LHV of the carbonized product C and the bulk density of the carbonized product C (the correlation represented by the graph of FIG. 3) is stored.

The control device 8 controls the control damper 16 on the basis of the LHV of the carbonized product C which is calculated by the LHV calculation unit 47.

The control device 8 gives an instruction to lower the LHV of the carbonized product C when the LHV of the carbonized product C is higher than X, that is, when the bulk density of the carbonized product C is low. That is, the control device 8 reduces a heat quantity of the heat medium supplied from the heat medium line 26 to the drier 3 by closing the control damper 16.

The control device 8 gives an instruction to increase the LHV of the carbonized product C when the LHV of the carbonized product C is lower than X, that is, when the bulk density of the carbonized product C is high. That is, the control device 8 increases a heat quantity of the heat medium supplied from the heat medium line 26 to the drier 3 by opening the control damper 16.

According to the above embodiment, since the heat quantity supplied to the wood biomass B inside the drier 3 per unit time is controlled on the basis of the bulk density of the carbonized product C in order to set the carbonized product C to a predetermined LHV, dried biomass having a moisture content that is most suitable for carbonization can be produced. That is, since the heat quantity supplied to the wood biomass B inside the drier 3 is adjusted such that the LHV of the carbonized product C has a proper value using the correlation between the LHV of the carbonized product C and the bulk density of the carbonized product C, the carbonized product C having stable quality can be produced.

The LHV of the carbonized product C is calculated using the correlation between the bulk density of the carbonized product C and the LHV of the carbonized product C, so that the LHV of the carbonized product C can be rapidly grasped. Due to a high correlation between the LHV of the carbonized product C and the bulk density of the carbonized product C, the LHV of the carbonized product C can be immediately calculated, compared to, for instance, a method of analyzing the carbonized product C.

In the above embodiment, the two storage tanks 36 are used for the bulk density measurement device 5, but the embodiment is not limited thereto. For example, the embodiment may be configured to measure the bulk density using one of the storage tanks 36 as long as the stored carbonized product C can be rapidly discharged. In addition, three or more storage tanks 36 may be installed.

[Second Embodiment]

Hereinafter, a biomass fuel production plant of a second embodiment of the present invention will be described in detail with reference to the drawings. In the present embodiment, a difference between the present embodiment and the aforementioned first embodiment will be mainly described, and description of the same portions will be omitted.

Figure 4:
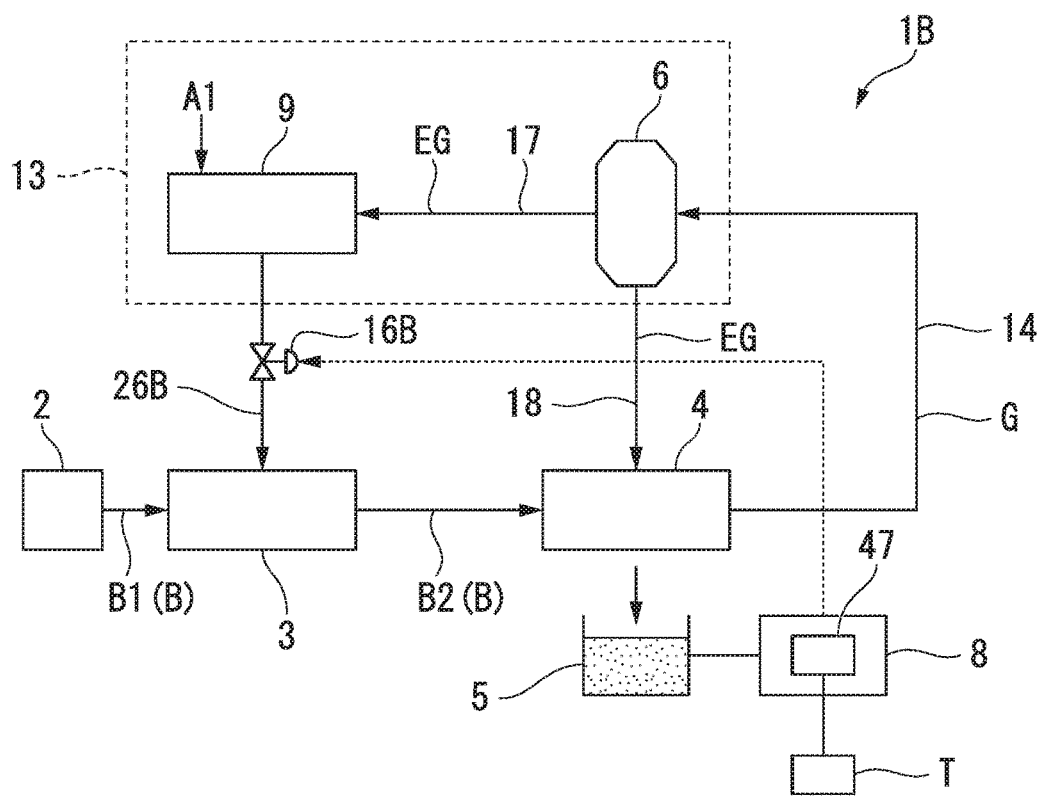
FIG. 4 is a system diagram of a biomass fuel production plant of a second embodiment of the present invention.

As shown in FIG. 4, a biomass fuel production plant 1B of the present embodiment includes a wood biomass supply device 2, a drier 3 that dries wood biomass B supplied from the wood biomass supply device 2, a carbonized product production device 4 that produces a carbonized product C from the wood biomass B, a bulk density measurement device 5 that measures a bulk density of the carbonized product C, a combustion furnace 6 that burns a pyrolytic gas G discharged from the carbonized product production device 4, an air preheater (a first heat exchanger) 9 that performs heat exchange between a combustion exhaust gas EG discharged from the combustion furnace 6 and air to produce high-temperature air, and a control device 8.

That is, a drying heat source 13 of the drier 3 of the present embodiment includes the combustion furnace 6 and the air preheater 9.

The air preheater 9 and the drier 3 are connected by a heat medium line 26B. A control damper 16B for adjusting a flow rate or a heat quantity of high-temperature air supplied to the drier 3 is provided on the heat medium line 26B. The control damper 16B can be controlled by the control device 8.

The combustion furnace 6 can be used as, for instance, a facility for incinerating sludge by agitating and mixing the sludge in a high-temperature fluidized bed. The combustion furnace 6 only needs to be an incineration facility that incinerates waste, biomass, or fossil fuel to discharge a high-temperature exhaust gas. An incineration facility such as a bubble type fluidized furnace, a circulation type fluidized furnace, a pulverized coal combustion furnace, or the like can be adopted as the combustion furnace 6.

The combustion exhaust gas EG is discharged from the combustion furnace 6 via a first combustion exhaust gas line 17 and a second combustion exhaust gas line 18. The temperature of the combustion exhaust gas EG discharged from the combustion furnace 6 is, for instance, 1000° C.

The combustion exhaust gas EG introduced into the first combustion exhaust gas line 17 is supplied to the air preheater 9, and is used to preheat air. The combustion exhaust gas EG introduced into the second combustion exhaust gas line 18 is supplied to the carbonized product production device 4, and is used to heat the wood biomass B.

A pyrolytic gas G generated in connection with the production of the carbonized product C in the carbonized product production device 4 is supplied to the combustion furnace 6 via the pyrolytic gas line 14.

The control device 8 adjusts the flow rate of the high-temperature air supplied to the drier 3 via the heat medium line 26B on the basis of a calculated LHV.

According to the above embodiment, since the combustion furnace 6 is used as the drying heat source 13, the high-temperature air can be stably produced.

[Third Embodiment]

Hereinafter, a biomass fuel production plant of a third embodiment of the present invention will be described in detail with reference to the drawings. In the present embodiment, a difference between the present embodiment and the aforementioned second embodiment will be mainly described, and a description of the same portions will be omitted.

Figure 5:
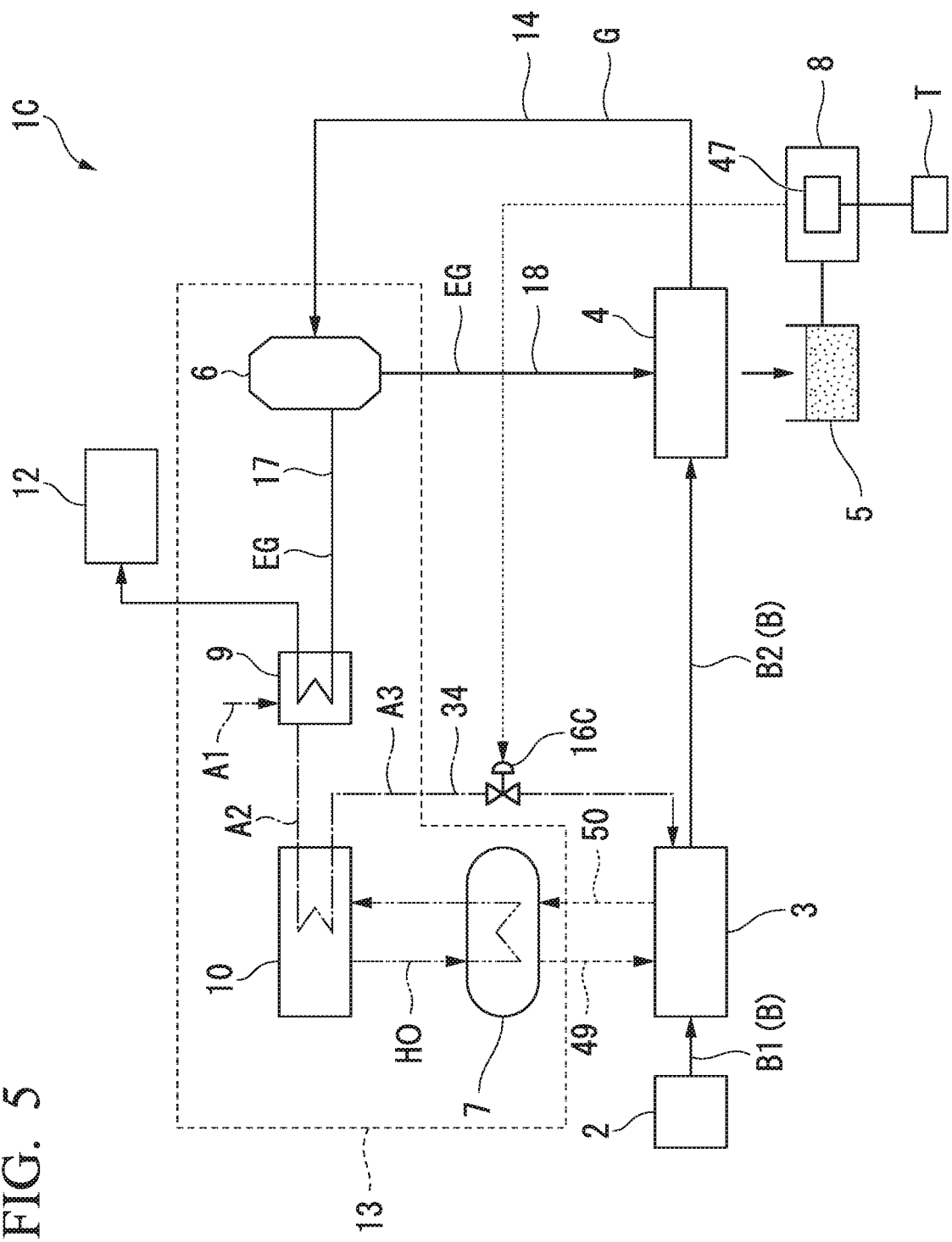
FIG. 5 is a system diagram of a biomass fuel production plant of a third embodiment of the present invention.

As shown in FIG. 5, a biomass fuel production plant 1C of the present embodiment includes a power generation device 7 that generates electricity using heat medium oil (a medium for power generation) HO as a heat source, an air preheater 9 that performs heat exchange between a combustion exhaust gas EG discharged from a combustion furnace 6 and air A1 to produce high-temperature air A2, and an oil heater (a second heat exchanger) 10 that performs heat exchange between the high-temperature air A2 discharged from the air preheater 9 and the heat medium oil HO, all of which are used as a drying heat source 13 for a drier 3.

The air preheater 9 is a heat exchanger that heat-exchanges (preheats) the combustion exhaust gas EG discharged from the combustion furnace 6 and the air A1, and supplies the heat-exchanged high-temperature air A2 to the oil heater 10. The combustion exhaust gas EG that has been completely used and is discharged from the air preheater 9 is treated by an exhaust gas treatment device 12.

The exhaust gas treatment device 12 may be configured to have, for instance, a dust collector (a bag filter) that performs a dust collection treatment of the combustion exhaust gas EG, a scrubber that brings a cleaning solution into contact with the combustion exhaust gas EG and makes the combustion exhaust gas EG harmless, and a chimney that discharges the treated combustion exhaust gas EG to the atmosphere.

The oil heater 10 is a heat exchanger that heat-exchanges (heats) the high-temperature air A2 discharged from the air preheater 9 and the heat medium oil HO supplied to the power generation device 7.

The power generation device 7 adopts a so-called binary waste heat power generation system (an organic Rankine cycle waste heat power generation system or an organic Rankine cycle power generation device (ORC power generation device)) that performs power generation by heating and evaporating a macromolecular organic working medium using waste heat (the combustion exhaust gas EG) of the combustion furnace 6 as a heat source, and rotating a steam turbine with steam.

The power generation device 7 performs power generation using heat of the heat medium oil HO heated by the oil heater 10.

Figure 6:
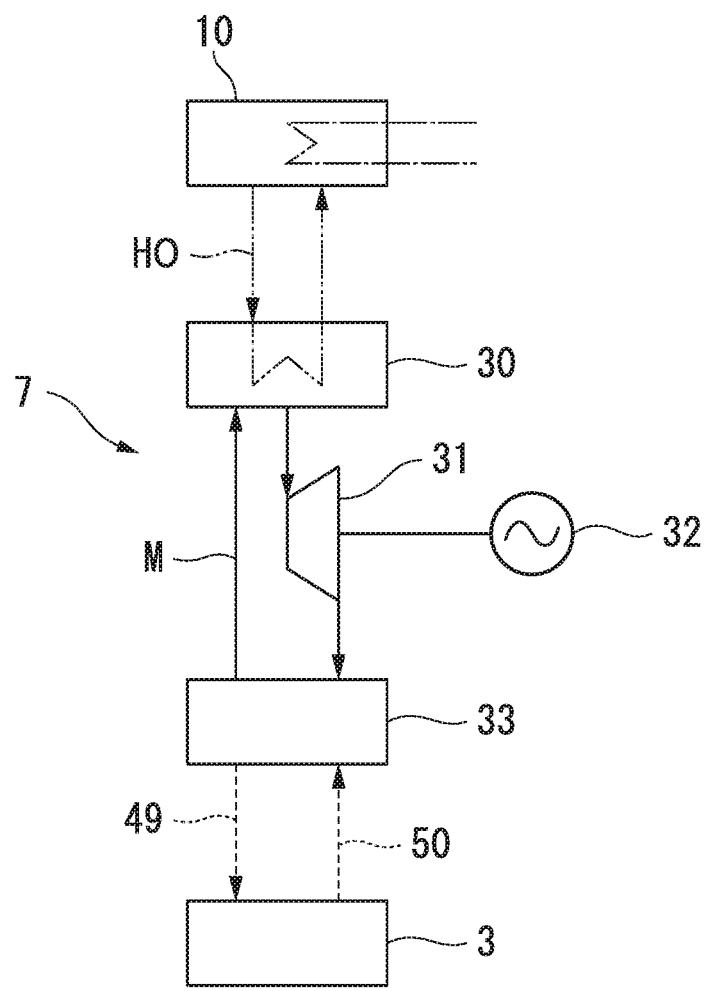
FIG. 6 is a system diagram of a power generation device of the biomass fuel production plant of the third embodiment of the present invention.

As shown in FIG. 6, the power generation device 7 has an evaporator 30 that heats and evaporates an organic working medium M using heat of the heat medium oil HO supplied to the power generation device 7, a steam turbine 31 that is rotated by steam of the organic working medium M, a power generator 32 that is directly connected to the steam turbine 31, and a condenser 33 that cools the organic working medium M guided from the steam turbine 31.

Hot water (e.g., about 90° C., a waste heat medium) discharged from the condenser 33 is introduced into the drier 3 via a first waste heat medium line 49, and is used as a drying heat source.

Hot water (e.g., about 50° C.) used as the drying heat source at the drier 3 is discharged via a second waste heat medium line 50, and is supplied to the condenser 33 of the power generation device 7.

As shown in FIG. 5, high-temperature air A3 subjected to heat exchange with the heat medium oil HO by the oil heater 10 is supplied to the drier 3 via a high-temperature air line 34. A control damper 16C for adjusting a flow rate or a heat quantity of the high-temperature air A3 supplied to the drier 3 is provided on the high-temperature air line 34.

The control damper 16C can be controlled by a control device 8. That is, the control device 8 adjusts the flow rate of the high-temperature air A3 supplied to the drier 3 via the high-temperature air line 34 on the basis of a calculated LHV.

According to the above embodiment, power generation can be performed using the heat of the combustion exhaust gas EG. In addition, waste heat of the power generation can be used as the heat source of the drier 3.

[Fourth Embodiment]

Hereinafter, a biomass fuel production plant of a fourth embodiment of the present invention will be described in detail with reference to the drawings. In the present embodiment, a difference between the present embodiment and the aforementioned third embodiment will be mainly described, and a description of the same portions will be omitted.

Figure 7:
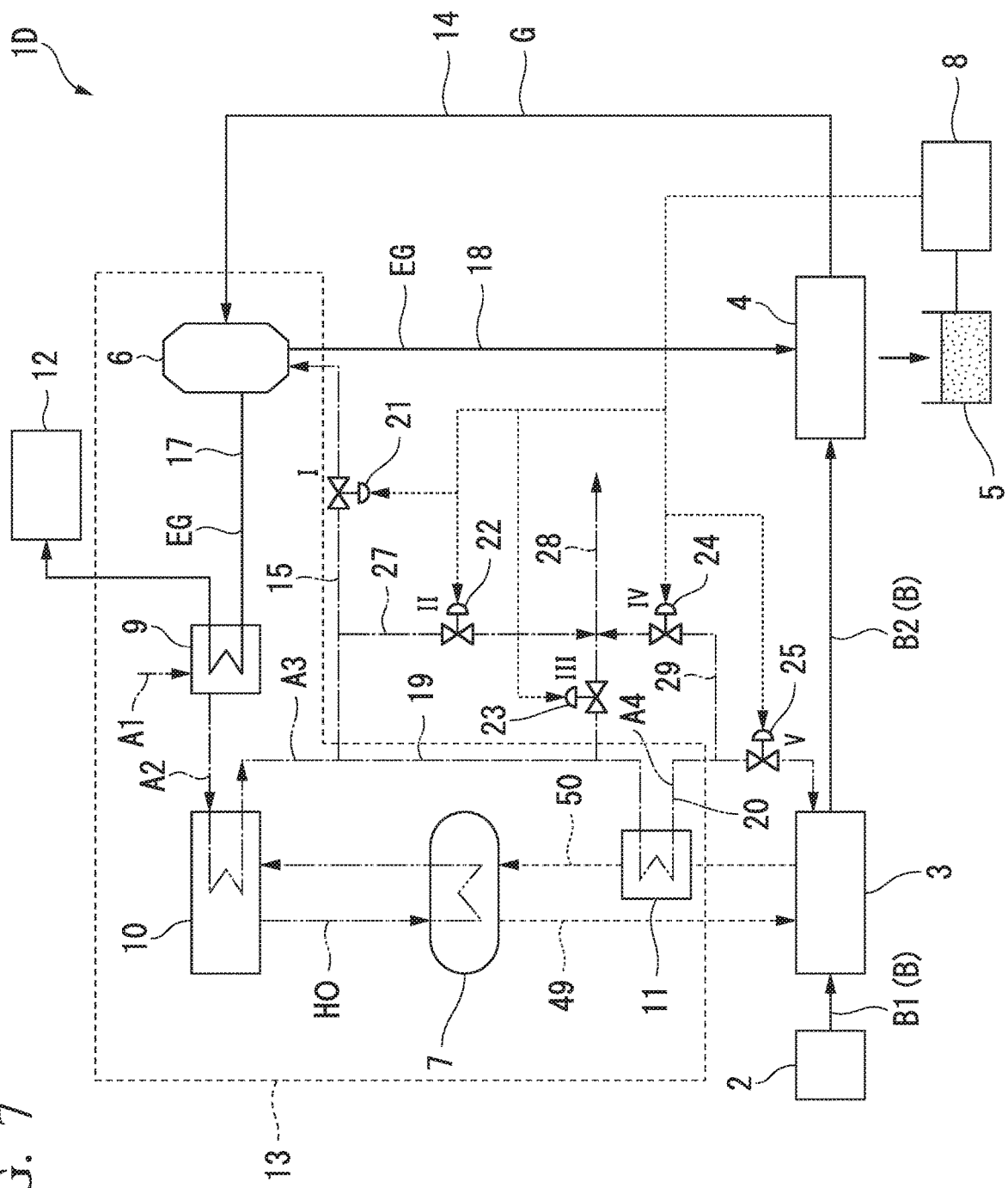
FIG. 7 is a system diagram of a biomass fuel production plant of a fourth embodiment of the present invention.

As shown in FIG. 7, a biomass fuel production plant 1D of the present embodiment includes a heat exchanger (a third heat exchanger) 11 provided on a second waste heat medium line 50. In comparison with the biomass fuel production plant 1C of the third embodiment, a supply path of high-temperature air A3 (e.g., about 200°C.) discharged from an oil heater 10 is different.

Next, the supply path of the high-temperature air A3 (e.g., about 200° C.) discharged from the oil heater 10 will be described.

The high-temperature air A3 discharged from the oil heater 10 branches off into a first high-temperature air line 19 and a combustion air line 15, and is supplied to them. The high-temperature air A3 flowing through the combustion air line 15 is supplied to a combustion furnace 6 as combustion air. A first control damper 21 for adjusting the flow rate of the combustion air flowing along the combustion air line 15 is provided on the combustion air line 15.

A first atmosphere discharge line 27 for discharging the high-temperature air A3 to the atmosphere branches off from a region of the combustion air line 15 which is located upstream from the first control damper 21. A second control damper 22 for adjusting a flow rate of the high-temperature air is provided on the first atmosphere discharge line 27. The second control damper 22 is controlled from a "closed" state to an "opened" state, the high-temperature air A3 is discharged to the atmosphere via a second atmosphere discharge line 28 connected to the first atmosphere discharge line 27.

The high-temperature air A3 discharged from the oil heater 10 is supplied to the heat exchanger 11 via a first high-temperature air line 19. The high-temperature air A3 supplied to the heat exchanger 11 is used to heat hot water discharged from a drier 3. The hot water is heated to, for instance, about 60° C. The second atmosphere discharge line 28 for discharging the high-temperature air A3 to the atmosphere branches off from the first high-temperature air line 19. A third control damper 23 for adjusting a flow rate of the high-temperature air is provided on the second atmosphere discharge line 28. The third control damper 23 is controlled from a "closed" state to an "opened" state, the high-temperature air A3 is discharged to the atmosphere via the second atmosphere discharge line 28. The third control damper 23 is disposed on the second atmosphere discharge line 28 and upstream from a connection point between the first atmosphere discharge line 27 and the second atmosphere discharge line 28.

High-temperature air A4 (e.g., about 100° C.) discharged from the heat exchanger 11 is supplied to the drier 3 via a second high-temperature air line 20. A fifth control damper 25 for adjusting a flow rate of the high-temperature air A4 is provided on the second high-temperature air line 20.

A third atmosphere discharge line 29 fir discharging the high-temperature air A4 to the atmosphere branches off from the second high-temperature air line 20. A fourth control damper 24 for adjusting the flow rate of the high-temperature air A4 is provided on the third atmosphere discharge line 29. The fourth control damper 24 is controlled from a "closed" state to an "opened" state, the high-temperature air A4 is discharged to the atmosphere via the second atmosphere discharge line 28 connected to the third atmosphere discharge line 29.

The control device 8 controls the control damper 16 as shown in Table 1 below. In Table 1, the "closed" state means that the control damper fully closes a flow passage. The "opened" state means that the control damper not only opens a flow passage but also opens a flow passage to perform control in a direction in which the control damper further opens the flow passage within the opened range (a direction in which the control damper widens the flow passage) or in a direction in which the control damper closes the flow passage (a direction in which the control damper narrows the flow passage).

TABLE 1

|  | NORMAL TIMES | HIGH LHV (MOISTURE CONTENT UP) | LOW LHV (MOISTURE CONTENT DOWN) |
| --- | --- | --- | --- |
| FIRST CONTROL DAMPER (I) | OPENED (AIR RATIO CONTROL) | OPENED (AIR RATIO CONTROL) | OPENED (AIR RATIO CONTROL) |
| SECOND CONTROL DAMPER (II) | CLOSED | OPENED OR CLOSED | CLOSED |
| THIRD CONTROL DAMPER (III) | CLOSED | OPENED | CLOSED |
| FOURTH CONTROL DAMPER (IV) | OPENED | OPENED | CLOSED |
| FIFTH CONTROL DAMPER (V) | CLOSED | CLOSED | OPENED |

The first control damper 21 is properly controlled depending on the flow rate of the combustion air required for the combustion furnace 6.

The second control damper 22, the third control damper 23, and the fifth control damper 25 are closed at normal times. That is, the high-temperature air is supplied to the heat exchanger 11, so that the hot water supplied to the power generation device 7 via the second waste heat medium line 50 is heated.

When it is determined that the LHV is low and the heat of the drier 3 is deficient, that is, when the moisture content of the wood biomass B is high, the fourth control damper 24 is closed, and the fifth control damper 25 is opened, so that the high-temperature air A4 that has been used at the heat exchanger 11 is used for the drier 3 as an auxiliary heat source.

When it is determined that the LHV is high and the heat of the drier 3 is excessive, that is, when the moisture content of the wood biomass B is low, the fifth control damper 25 is closed, and the third control damper 23 and the fourth control damper 24 are opened, so that an amount of supply of the high-temperature air supplied to the combustion furnace 6 and an amount of supply of the high-temperature air supplied to the heat exchanger 11 are reduced. That is, a part of the high-temperature air is discharged to the atmosphere.

The above embodiment is configured to control the plurality of control dampers to discharge a part of the high-temperature air to the atmosphere, so that it is possible to cope with a greater change in the moisture content.

While the embodiments of the present invention have been described in detail, various modifications can be made without departing the technical idea of the present invention.

For example, in the biomass fuel production plant 1D of the fourth embodiment, the heat exchanger 11 is provided on the second waste heat medium line 50. However, without being limited thereto, the heat exchanger 11 may be provided on the first waste heat medium line 49, and heat the hot water supplied to the drier 3.

REFERENCE SIGNS LIST 1, 1B, 1C, 1D Biomass fuel production plant
2 Wood biomass supply device
3 Drier (drying device)
4 Carbonized product production device
5 Bulk density measurement device
6 Combustion furnace
7 Power generation device
8 Control device
9 Air preheater (first heat exchanger)
10 Oil heater (second heat exchanger)
11 Heat exchanger (third heat exchanger)
12 Exhaust gas treatment device
13 Drying heat source
14 Pyrolytic gas line
15 Combustion air line
16, 16B, 16C Control damper
17 First combustion exhaust gas line
18 Second combustion exhaust gas line
19 First high-temperature air line
20 Second high-temperature air line
21 First control damper
22 Second control damper
23 Third control damper
24 Fourth control damper
25 Fifth control damper
26, 26B Heat medium line
27 First atmosphere discharge line
28 Second atmosphere discharge line
29 Third atmosphere discharge line
30 Evaporator
31 Steam turbine
32 Power generator
33 Condenser
34 High-temperature air line
36 Storage tank
36a First storage tank
36b Second storage tank
38 Duct
39 Upstream side duct
40 Branch part
41 Downstream side duct
42 Switching damper
44 Level meter
45 Weighing scale
47 LHV calculation unit
49 First waste heat medium line
50 Second waste heat medium line
52 Screw conveyor
53 External heat type pyrolytic gasification furnace
54 Chute
57 Heating gas amount adjusting device
58 External cylinder
59 Internal cylinder
60 Movable side support
61 Annular frame
62 Support member
63 Stationary side support
64 Driving device
65 Gear
66 Driving motor
67 Pinion gear
68 Installation surface
69 Heating gas combustion furnace
70 Heating gas supply pipe.
71 Heating gas outgoing pipe
72 Heating gas amount adjusting damper
73 Induction fan
74 Inspection window
75 Non-contact thermometer
77 Expansion
B Wood biomass
C Carbonized product
EG Combustion exhaust gas
G Pyrolytic gas
HO Heat medium oil (medium for power generation)
M Organic working medium

The invention claimed is:

1. A biomass fuel production plant comprising:
a drying heat source configured to generate a heat medium;
a drying device configured to use the heat medium supplied from the drying heat source to heat and dry wood biomass;
a carbonized product production device configured to perform pyrolysis of the dried wood biomass to produce a carbonized product;
a bulk density measurement device configured to measure a bulk density of the carbonized product discharged from the carbonized product production device; and
a control device configured to control a heat quantity of the heat medium supplied to the wood biomass in the drying device,
wherein the control device includes an LHV calculation unit that is configured to calculate an LHV of the carbonized product from the bulk density on the basis of a non-linear correlation between the bulk density and the LHV of the carbonized product, and
wherein the control device controls the heat quantity of the heat medium supplied to the wood biomass in the drying device on the basis of the calculated LHV.

2. The biomass fuel production plant according to claim 1, wherein:
the drying heat source has
a combustion furnace that is configured to burn a pyrolytic gas discharged from the carbonized product production device, and
a first heat exchanger that is configured to perform heat exchange between a combustion exhaust gas discharged from the combustion furnace and air to generate high-temperature air; and
the heat medium is the high-temperature air subjected to heat exchange with the combustion exhaust gas by the first heat exchanger.

3. The biomass fuel production plant according to claim 2, wherein the drying heat source includes:
a power generation device that uses the high-temperature air as a heat source; and
a first waste heat medium line that is configured to supply a waste heat medium having waste heat from the power generation device to the drying device as a heat source.

4. The biomass fuel production plant according to claim 3, wherein:
the drying heat source includes a second heat exchanger that is configured to perform heat exchange between the high-temperature air and a medium for power generation that serves as the heat source of the power generation device; and
the heat medium is the high-temperature air that has been subjected to heat exchange with the medium for power generation by the second heat exchanger.

5. The biomass fuel production plant according to claim 4, wherein:
the drying heat source includes
a second waste heat medium line that is configured to supply the waste heat medium that has been used by the drying device to the power generation device, and
a third heat exchanger that is provided on at least one of the first waste heat medium line and the second waste heat medium line, and performs heat exchange between the high-temperature air that has been subjected to heat exchange with the medium for power generation by the second heat exchanger and the waste heat medium, and
the heat medium is the high-temperature air that has been subjected to heat exchange with the waste heat medium by the third heat exchanger.

6. The biomass fuel production plant according to claim 3, wherein:
the power generation device is an ORC power generation device that is configured to evaporate a macromolecular organic working medium to perform power generation; and
the waste heat medium is hot water that is used to cool the ORC power generation device.

7. The biomass fuel production plant according to claim 1, wherein:
the LHV calculation unit is configured to calculate the LHV of the carbonized product from the bulk density based on the correlation between the LHV of the carbonized product and the bulk density of the carbonized product, which is stored in advance in the control device.

8. The biomass fuel production plant according to claim 1, wherein:
the LHV calculation unit is configured to calculate the LHV of the carbonized product from the bulk density using a table in which the correlation between the LHV of the carbonized product and the bulk density of the carbonized product is stored.

* * * * *